United States Patent
Watanabe

[19]

[11] Patent Number: 6,148,366
[45] Date of Patent: Nov. 14, 2000

[54] STORAGE SYSTEM WHICH TRANSFERS A COMMAND AND DATA CORRESPONDING TO SAID COMMAND SUBSEQUENT TO SAID COMMAND

[75] Inventor: Naoki Watanabe, Odawara, Japan

[73] Assignee: Hitachi, Ltd., Tokyo, Japan

[21] Appl. No.: 08/977,342

[22] Filed: Nov. 24, 1997

[30] Foreign Application Priority Data

Nov. 28, 1996 [JP] Japan ................................. 8-317431

[51] Int. Cl.$^7$ ................................................. G06F 13/14
[52] U.S. Cl. ............................................. 711/112; 711/57
[58] Field of Search ........................... 711/111, 112, 113, 711/114, 154, 169; 710/52, 56, 57, 5, 6

[56] References Cited

U.S. PATENT DOCUMENTS

| | | | |
|---|---|---|---|
| 5,317,713 | 5/1994 | Glassburn | 711/113 |
| 5,530,948 | 6/1996 | Islam | 714/6 |
| 5,721,840 | 2/1998 | Soga | 710/129 |
| 5,745,789 | 4/1998 | Kakuta . | |
| 5,765,193 | 6/1998 | Rosich et al. | 711/136 |

FOREIGN PATENT DOCUMENTS

| | | |
|---|---|---|
| 89-015843 | 1/1989 | Japan . |
| 5-265661 | 10/1993 | Japan . |
| 93-257609 | 10/1993 | Japan . |
| 97-034782 | 2/1997 | Japan . |
| 89-114530 | 4/1989 | WIPO . |

OTHER PUBLICATIONS

"Detailed Explanation of SCSI–2 (Latest SCSI Standards and Command Reference)" by Sei–ichi Sugaya, published by CQ Co., pp. 112–119.

*Primary Examiner*—Eddie P. Chan
*Assistant Examiner*—Kevin L. Ellis
*Attorney, Agent, or Firm*—Mattingly, Stanger & Malur, P.C.

[57] ABSTRACT

In a storage system comprising a disk controller, a disk unit having queue memory for storing the commands, and network between the disk controller and the disk unit, to decrease a overhead in the write processing in issuing a write command to a disk unit, a disk controller designates whether the data be transferred after the command or not depending upon the upper-limit length of the block that can be transferred simultaneously with the write command that is determined between the disk controller and the disk unit at the time of initialization, the disk controller sends the write data to the disk unit together with the write command—when the amount of write data in the write processing is small, and, the disk unit queues the write command and stores the write data onto the cache memory on the disk unit.

12 Claims, 7 Drawing Sheets

FIG. 5

STORAGE SYSTEM WHICH TRANSFERS A COMMAND AND DATA CORRESPONDING TO SAID COMMAND SUBSEQUENT TO SAID COMMAND

BACKGROUND OF THE INVENTION

The present invention relates to a storage system which includes a disk controller, a disk unit, and an interface unit between the disk controller and the disk unit(s) and, particularly, to a storage system for efficiently controlling many disk units by improving the efficiency for utilizing the interface.

In order to efficiently utilize the disk units, a variety of functions have been specified under the Interface Standards SCSI (small computer system interface) by ANSI (American National Standards Institute). In January, 1994, SCSI-2 was adopted as an ANSI standard. The SCSI-2 specifies a command queuing function according to which a target (disk unit) accepts a plurality of commands from an initiator (disk controller) and queues them. The command queuing is executed in order to reduce the overhead for re-issuing the commands from the disk controller when the disk unit is busy and for reducing the overhead time before the next command processing is started. The queued commands are executed and scheduled so that there is no inconsistency in the commands issued by the disk controller and so that the execution time is at its shortest as indicated by SCSI-2, 7.8.3.2., Example of Tagged Queuing. Queuing the commands as described above allows reduced overhead time and efficient use of the disk unit. The command queuing of SCSI-2 has been disclosed in "Detailed Explanation of SCSI-2 (Latest SCSI Standards and Command Reference)" by Sei-ichi Sugaya, published by CQ Co., pp. 112–119.

SUMMARY OF THE INVENTION

According to the above description, the command queuing is effective when the SCSI bus and the disk controller have sufficient capacities relative to the disk unit. A problem, however, arises concerning the loads on the disk controller and on the SCSI bus when many SCSI buses are connected to a single disk controller and many disk units are connected to each SCSI bus.

In the read processing of the disk unit, two processings are executed, i.e., command issuing and data reading are executed when there is no command queuing. When there is command queuing, these processings are nearly the same and the overhead is increased to add a tag.

In the write processing of the disk unit, on the other hand, processings are different from ones in the read processing. When there is no command queuing, two processings are executed in the write processing, i.e., "command issuing & data transfer" and "return of status". In this case, the disk controller doesn't send a next command for the next processing before the disk unit finishes the previous processing because there isn't a queue for commands in a disk unit. When there is a command queuing, however, three processings must be executed in the write processing, i.e., "command issuing", "data transfer" and "return of status". The disk unit doesn't have means for handling a plurality of data and the disk controller doesn't have means for deciding whether the disk controller sends a command with data or not. When the command queuing is effected as described above, overhead increases for the disk controller and the SCSI buses in the write processing, making it difficult to enhance the performance of the system as a whole.

An object of this invention is to reduce the above mentioned load in a storage system.

To achieve the object, in a storage system which highly efficiently utilizes the disk units upon queuing the read or write commands issued by a disk controller, the disk controller designates whether the data is to be transferred to the disk units after the command or not at the time when the write command is issued in relation to the write processing. Whether the write data is transferred or not is determined by the upper-limit length of the block that is transferred simultaneously with a write command that is determined between the disk controller and the disk unit at the time of initialization. The above designation method according to SCSI effects the designation by using a bit specific to a vendor of control byte in the CDB (command descriptor block). This can be realized even by an interface other than SCSI if the data can be designated at the time of issuing the command.

The disk unit receives a control byte, learns whether the write data are to be transferred or not, and receives write data following the command. The commands are stored in a command queue, and the write data that are received are stored in a cache memory in the disk unit. Pointers to the write data are queued together with the command. The command is kept waiting until its turn of execution arrives in the command queue. When its turn of execution arrives, the processing of the write command is started, the write data on the cache indicated by a pointer is written onto the disk, and the status of end is returned to the disk controller.

In order to decrease the number of processings (command issue, data transfer and status) during the write processing while queuing the command according to the present invention, the disk controller sends the write command and the write data to the disk unit at a time when the write data is small in amount in the write processing, and the disk unit queues the write commands and stores the write data in the cache of the disk unit. When the write command is being executed by the disk unit, therefore, no processing needs be executed for transferring the write data from the disk controller, the overhead of the SCSI buses and the processing of the disk controller can be decreased, and many SCSI buses and disk units can be controlled by a small number of disk controllers based upon the command queuing.

DETAILED DESCRIPTION OF THE PREFERRED EMBODIMENT

Figure 1:
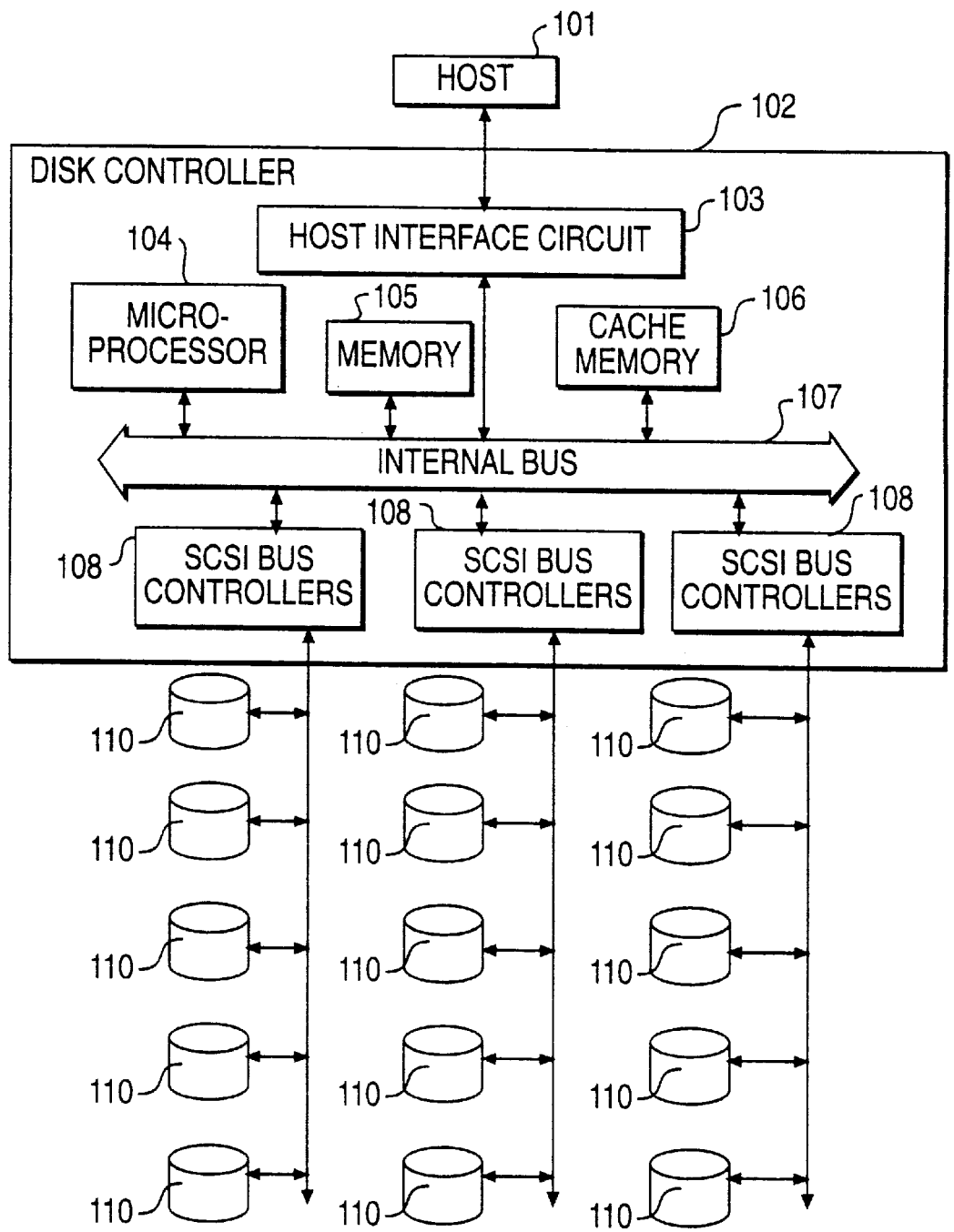
FIG. 1 is a block diagram illustrating a configuration of a storage according to the present invention.

FIG. 1 illustrates a storage system according to an embodiment of the present invention. This embodiment deals with a case where a magnetic disk unit (hereinafter referred to as disk unit) is used as a storage, and an SCSI(Small Computer System Interface) bus is used as an interface for connecting the disk unit and the disk controller. It is, however, also allowable to connect a device other than a magnetic disk unit as a storage, or to accomplish the connection by using an interface other than an SCSI bus.

As shown in FIG. 1, the storage system of this embodiment is constituted roughly by a disk controller 102, disk units 110, and SCSI buses 109 which are interfaces for connecting the disk units 110 to the disk controller 102.

The disk controller 102 includes SCSI bus controllers 108 for controlling the SCSI buses 109, a host interface circuit 103 for controlling the interface relative to a host 101, a microprocessor 104, a memory 105 storing a microprogram for controlling the disk controller, a cache memory 106 for temporarily storing the data transferred between the host 101 and the disk units 110, and an internal bus 107 for connecting these circuits(103, 104, 105, 106, 108).

When a write instruction for writing data is issued from the host 101 to the host interface circuit 103, the microprocessor 104 stores the write data in the cache memory 106 from the host interface circuit. The microprocessor 104 analyzes the write instruction, calculates a disk unit 110 in which the write data are to be stored, a logic block address thereof and the length of a logic block, and writes the data by using an SCSI bus controller 108 of an SCSI bus 109 to which the disk unit 110 is connected.

The write processing will now be described in detail with reference to FIG. 2 to FIG. 5.

Figure 2:
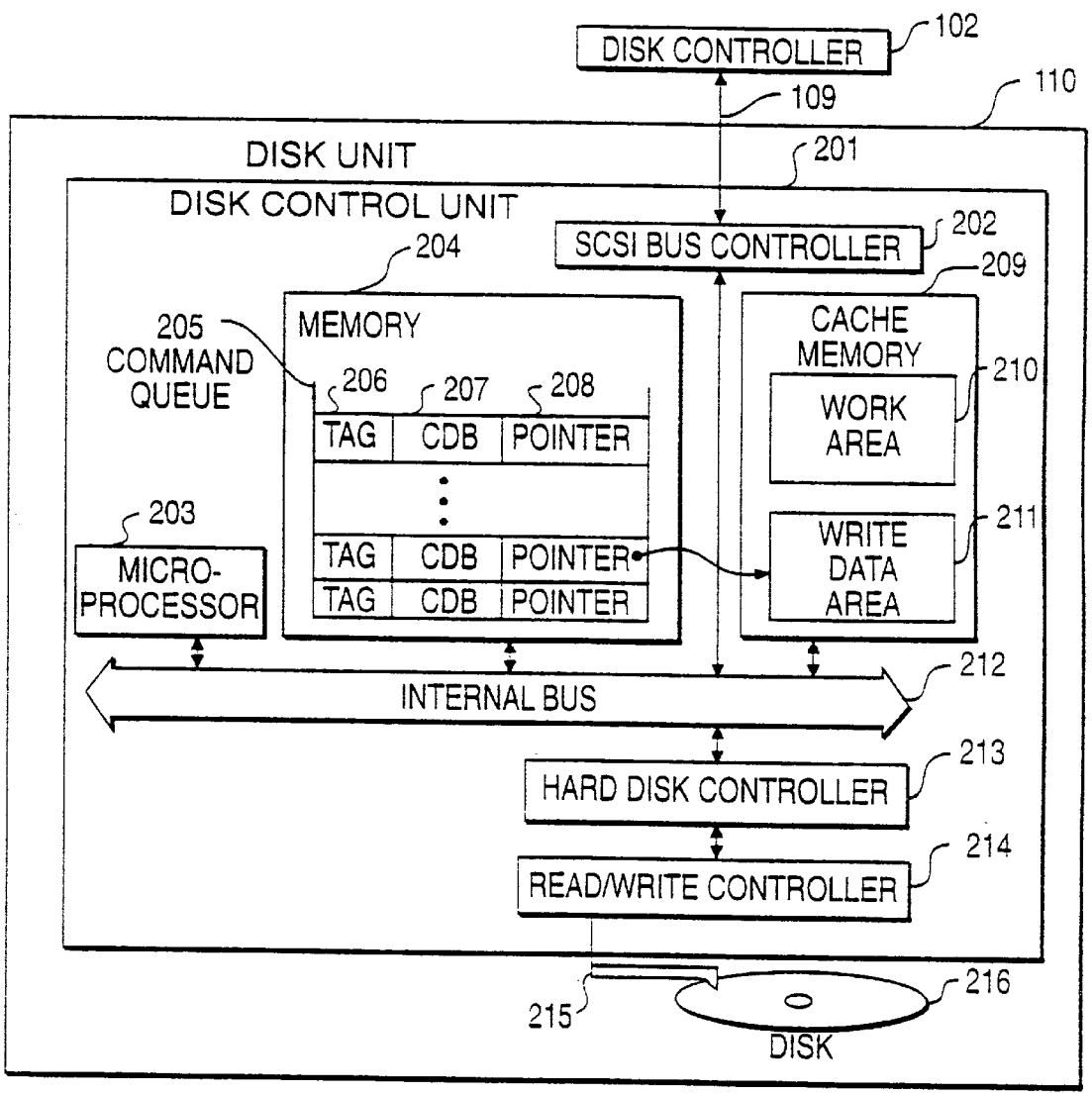
FIG. 2 is a block diagram illustrating a configuration of a storage according to the present invention.

FIG. 2 illustrates a configuration of the disk unit 110 of FIG. 1. The disk units 110 of FIG. 1 are each constituted as shown in FIG. 2. The disk unit 110 includes a disk control unit 201, disk 216 for storing the data, and an actuator 215 for reading and writing data of the disk 216.

The disk control unit 201 includes an SCSI bus controller 202 for controlling the SCSI bus 109 which is an interface relative to the disk controller 102, a microprocessor 203 for controlling the disk unit as a whole, a memory 204 for storing data such as a microprogram and a command queue of the microprocessor 203, a cache memory 209 for temporarily storing the data transferred between the disk controller 102 and the disk 216, and an internal bus 212 for connecting the circuits (202, 203, 204, 209, 213).

In this embodiment, the memory 204 includes a command queue 205. The command queue 205 includes tags 206 which are command identifiers, CDBs (Command Descriptor Blocks) 207 which are the commands themselves, and pointers 208 indicating places for storing command write data. The cache memory 209 includes a work area 210 and a write data area 211 in the queue. Provision of the pointers 208 and the write data area 211 permits write-data-queuing of small amounts of data.

Figure 3:
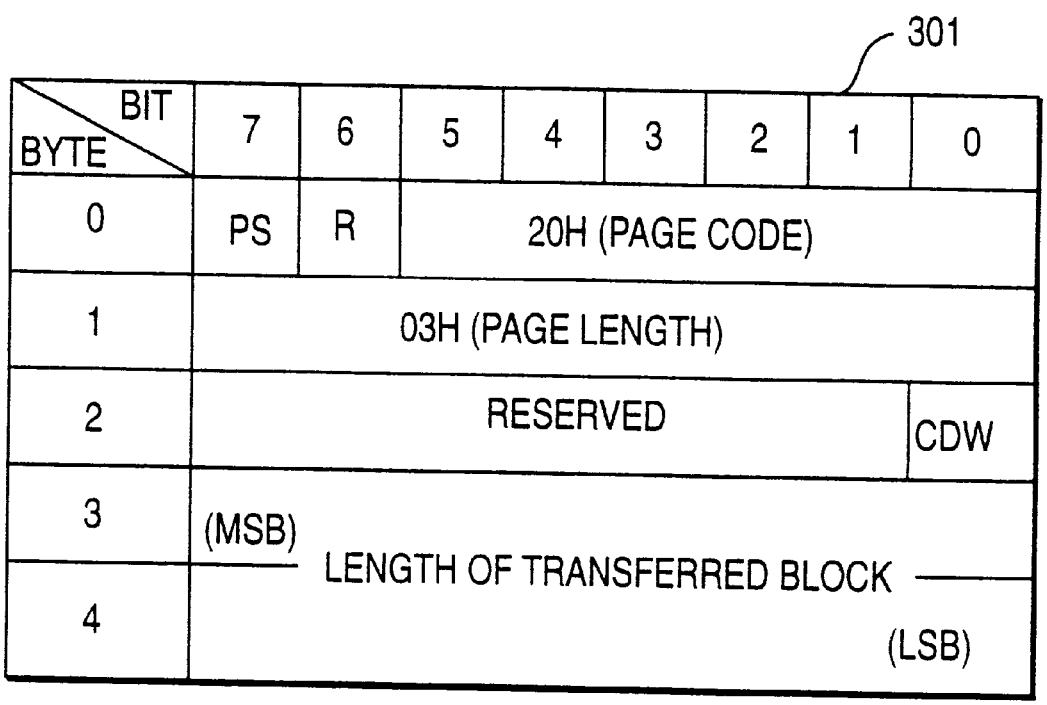
FIG. 3 is a diagram illustrating an example of description of mode select parameters according to the present invention.

FIG. 3 shows the mode select parameter according to this embodiment. This parameter is generated by the disk controller as follows. When the disk controller supports the present invention and initiates the disk unit, the disk controller sends a mode sense command including "PAGE CODE=20H" to the disk unit to check a mode of the disk unit. The disk unit sends mode information (FIG. 3) of vendor, type which represents whether the disk unit supports this present invention or not, disconnect/disconnect parameter, etc. to the disk controller in response to the mode sense command. The disk controller gets the mode information from the disk unit. The page code is used for specifying the vendor.

The mode select parameter (FIG. 3) consists of PS (bit 7 in byte 0) which is parameter savable, R (bit 6 in byte 0) or Reserved (byte 2) which is a reserved field, page code (bit 5-0 in byte 0), page length (byte 1), length of transferred block (byte 3 and 4) and bit 0 in byte 2 which is a CDW (Command Data Write) that describes whether the present invention is acceptable or not in the disk unit. The length of the transferred block (byte 3 and 4) shows an upper limit of data that can be transferred together with the command and relates to an amount of cache memory in the disk unit. The CDW in FIG. 3 is set by the disk unit in response to the mode sense command from the disk controller. The disk controller 102 can transfer the data immediately after the transfer of the command only when CDW is "1" and the transfer data is smaller than the upper-limit length of the transferred block. The above embodiment is based upon an SCSI. At the time of initialization as described above, however, another interface can be employed for mounting provided the CDW acceptability and the upper limit of the length of the transferred block can be designated. The disk controller refers to the parameter of FIG. 3 when the disk controller generates write commands, so the disk controller stores the parameter on the memory 105 after receiving it from the disk unit.

Figure 4:
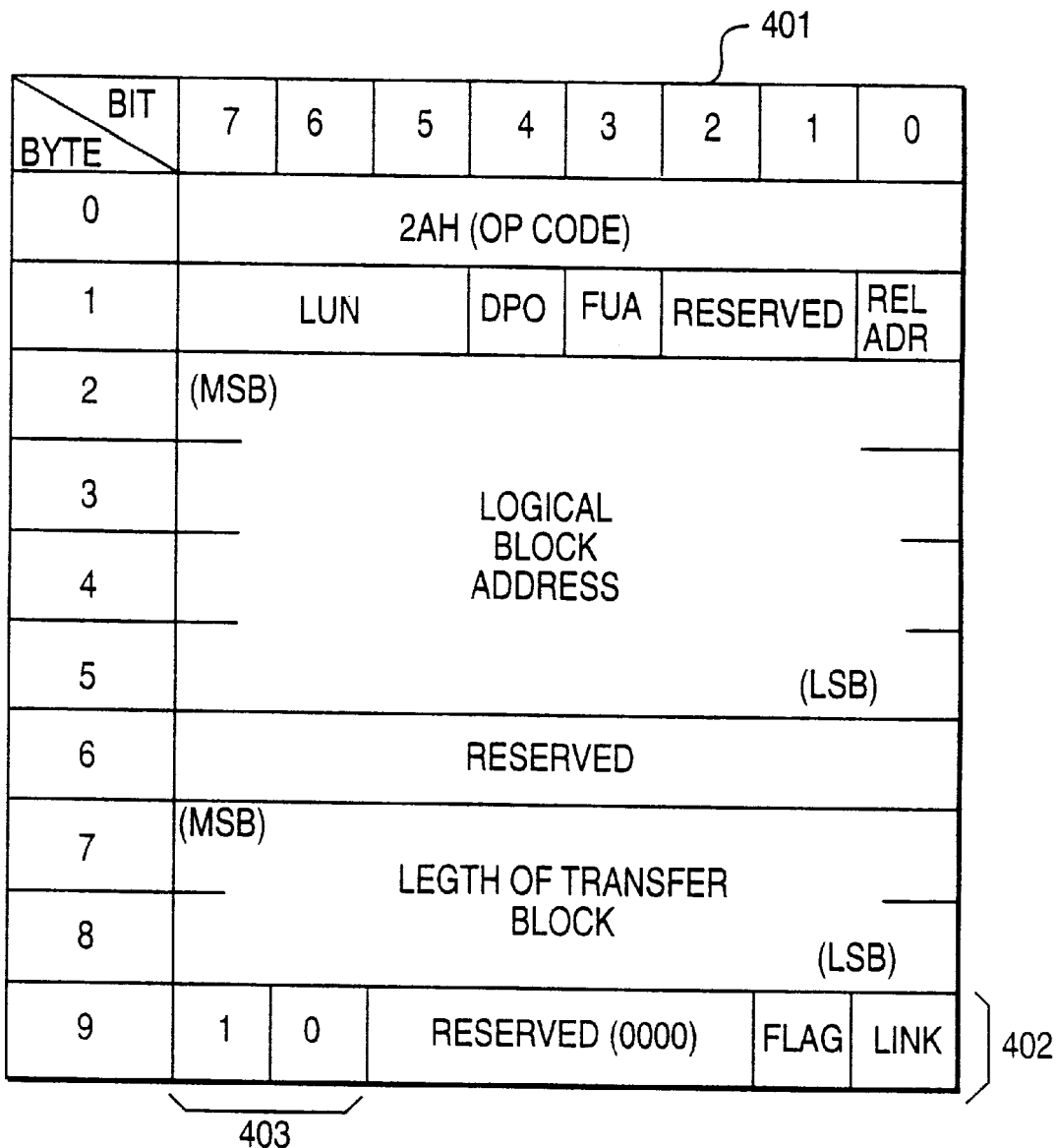
FIG. 4 is a diagram illustrating an example of description of an SCSI command according to the present invention.

FIG. 4 illustrates a CDB (Command Descriptor Block) description of a disk operation command, such as a write command which is transferred from the disk controller to the disk unit according to this embodiment. This write command is transferred to the disk unit by the disk controller after establishing a connection between the disk controller and the disk unit on the SCSI bus by the disk controller, when the host sends a request for writing data to the disk controller. In the SCSI standard, the high-order two bits of a byte 9 (control byte 402) are assigned specifically for the vendor. By using these bits 403, therefore, it is designated whether the data is to be transferred simultaneously with the write command or not. In this embodiment, the write command and the data are simultaneously transferred when the bits are "1", and are separately (normally) transferred when the bits are "00". Whether the write command and the data can be simultaneously transferred or not is determined by the disk controller 102. The disk controller sends a command and the respective data together to the disk unit when the data from the host is smaller than the upper-limit length and it sends them separately when the data from the host is larger than the upper-limit length. Also, the disk controller 102 designates the length of the transferred block in the write command.

According to the present invention, the disk controller 102 designates, in the write command, whether the data is to be transferred or not at the time when the write command is being transferred. This embodiment is disclosed with respect to using SCSI buses. However, the present invention can be realized even with other interfaces if it is designated, in a write data message in the other interface, whether the data is to be transferred together with the write command or not.

Figure 5:
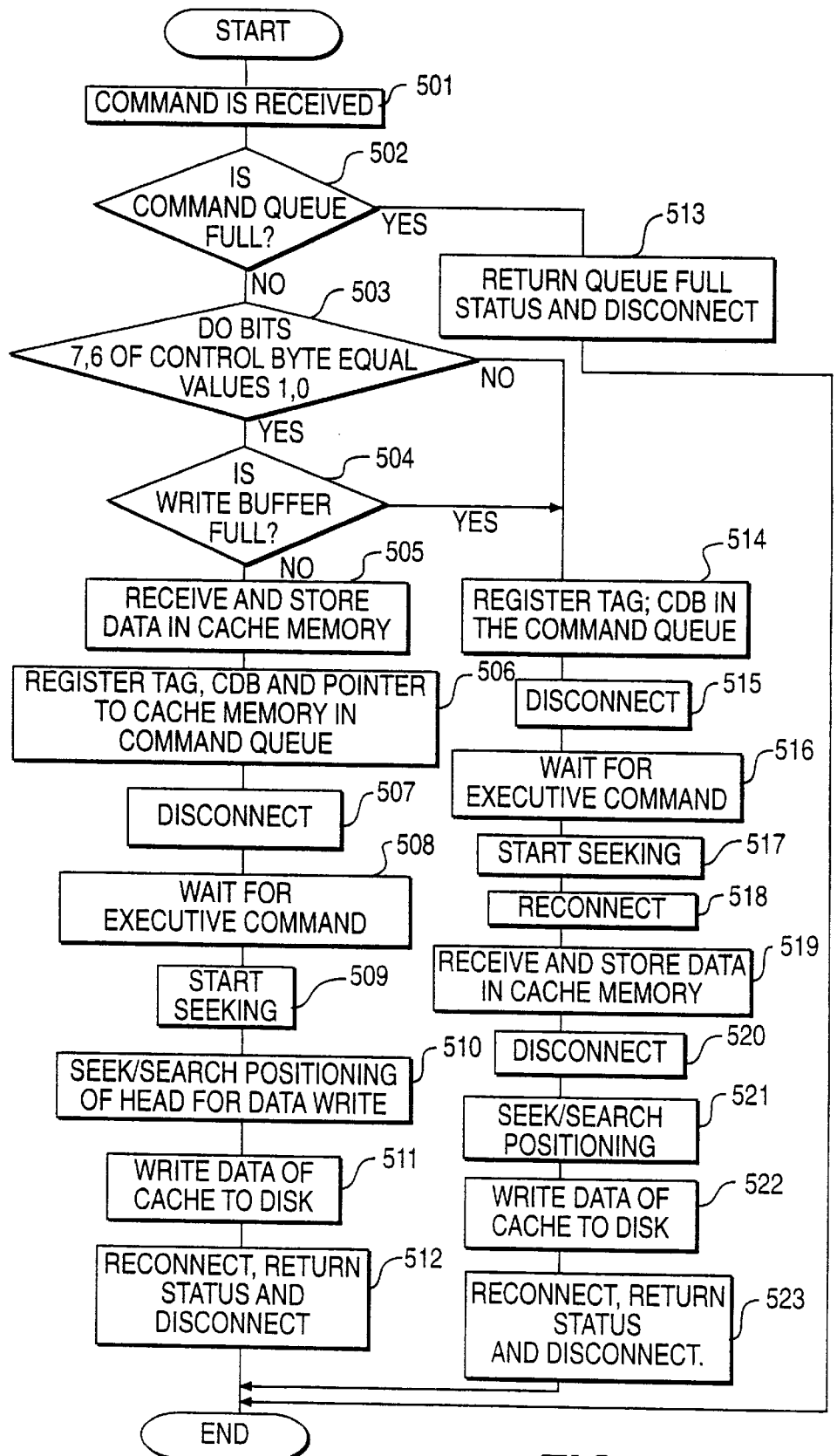
FIG. 5 is a flow chart illustrating the operation of the disk unit according to the present invention.

FIG. 5 is a flow chart illustrating the operation of the disk unit 110 when it receives a write command according to the embodiment. The operation will now be described by using the flow chart of FIG. 5 based on an assumption that the disk unit 110 of FIG. 1 has received the write command.

When the disk unit 110 receives a write command issued by the disk controller 102 via the SCSI bus controller 108 (501), the microprocessor 203 in the disk unit 110 attempts to insert the received command in the command queue 205 in the memory 204. When the command queue 205 is full and is therefore incapable of queuing the commands, the disk unit 110 returns a queue full status to the disk controller 102, disconnects (513) connection between the disk controller and the disk unit and ends the processing.

When the command queue 205 is not full, the microprocessor 203 checks bits 7 and 6 in the control byte of CDB (503). When it is "10", the flow proceeds to the processing for receiving the data (504 to 512). In other cases, the microprocessor 203 effects the queuing for the ordinary write commands (514 to 523).

First, described below is the case of receiving the data. When bits 7 and 6 in the control byte='10', the microprocessor 203 checks whether the available capacity of the write data area 211 is larger than the length or size of the transferred block described in the CDB or not(504). The ordinary write command queuing is effected (514 to 523) when the capacity of the write data area 211 is smaller than the length of the transferred block, and the data are received (505 to 512) when the capacity is greater than the length of the transferred block.

In the SCSI, the SCSI bus controller 108 in the disk controller 102 which is the initiator follows the phase transition of the disk unit 110 which is the target.

When the write data area 211 is capable of storing write data, the microprocessor 203 in the data phase instructs the SCSI controller 202 to receive data from the disk controller 102 and to store them in the write data area 211 in the cache memory 209 (505). At this time, the disk unit changes a transfer phase of the SCSI bus into a phase of data transfer in order to make the disk controller send the data subsequently to the write command to the disk unit. The disk controller sends the write data to the disk unit after detecting the phase of data transfer on the SCSI bus. After the disk unit receives the data from the disk controller, the microprocessor 203 stores the write data into the cache memory and stores into the command queue 205 together the tag, the CDB and a pointer 208 which indicates the head address of a region where the write data are stored (506). A null pointer is inserted into the command queue in the processings other than the processing of the write command. After that the disk unit releases the SCSI bus 109 (507 Disconnection). The disconnection is effected simultaneously with the processing to release the SCSI bus 109 (507). After the SCSI bus is released, the disk unit 110 can receive other commands. The commands that are received during this period are analyzed by the microprocessor 203 and are inserted in the command queue 205 in the memory 204. The commands are executed in the order in which they are stored in the queue (508). Thus, when there are some commands in the queue before storing the write command into the queue, the write command is executed after the commands, that should be executed earlier than the write command, are all executed.

As the command is started to execute, the microprocessor 203 instructs a hard disk controller 213 (509) that the actuator 215 be moved to a logic block address that has been described in the CDB 207. When the seek/search positioning ends (510), the microprocessor 203 instructs the read/write control circuit 214 that the write data in the write data area 211 in the cache memory 209 be written onto the disk (510). After the data are written onto the disk, the microprocessor 203 instructs a tag 206 of the command for the disk controller 102 which is an initiator corresponding to the SCSI bus controller 202, and effects the reconnection. After the reconnection is established, the status "command complete" is transferred from the disk unit to the disk controller, and the disconnection is effected by the disk unit to end the processing of the command.

Next, briefly described below is the case where no data is received after the command is received (ordinary queuing of write commands). When the bits 7, 6 of the control byte are other than "10" or when the available capacity of the write data area 211 is smaller than the length of the transferred block, no write data is received after the write command is received. In such a case, the queuing of ordinary write commands is effected as shown in steps 514 to 523.

After the command is received (501), the microprocessor 203 stores the received tag CDB in the command queue 205 (514) and, then, effects the disconnection (515) to release the SCSI bus 109. Thereafter, the command is not executed until the commands that must be executed earlier than the command, are all executed. As the microprocessor 203 executes the commands in the command queue 205 and the execution time of the command arrives (516), the hard disk controller 213 is so instructed that the actuator 215 moves to a logic block address described in the CDB 207 (517). In order to receive the write data from the disk controller 102, simultaneously with the start of seeking (517) or in response to the start of seeking, the tag 206 of the command is instructed to the SCSI bus controller 202 to start reconnection (518). When the reconnection is established, the disk unit 110 receives, via the SCSI bus 109, the write data stored in the cache memory 106 in the disk controller 102, and the microprocessor 203 causes the SCSI bus controller 202 to store the data in the work area 210 in the cache memory 209 (519). After the write data have all been transferred to the work area 210, the microprocessor 203 instructs the SCSI bus controller 202 to effect the disconnection to release the SCSI bus 109 (520). After the end of the seek/search positioning (521), the microprocessor 203 instructs the read/write controller 214 to write, onto the disk, the write data in the write data area 211 in the cache memory 209 (522). After the data are written onto the disk, the microprocessor 203 instructs the disk controller 102 which is the initiator that corresponds to the SCSI bus controller 202 to effect the reconnection. After the reconnection is established, the status "command complete" is transferred, and the disconnection is effected to end the processing of the command (523).

Figure 6:
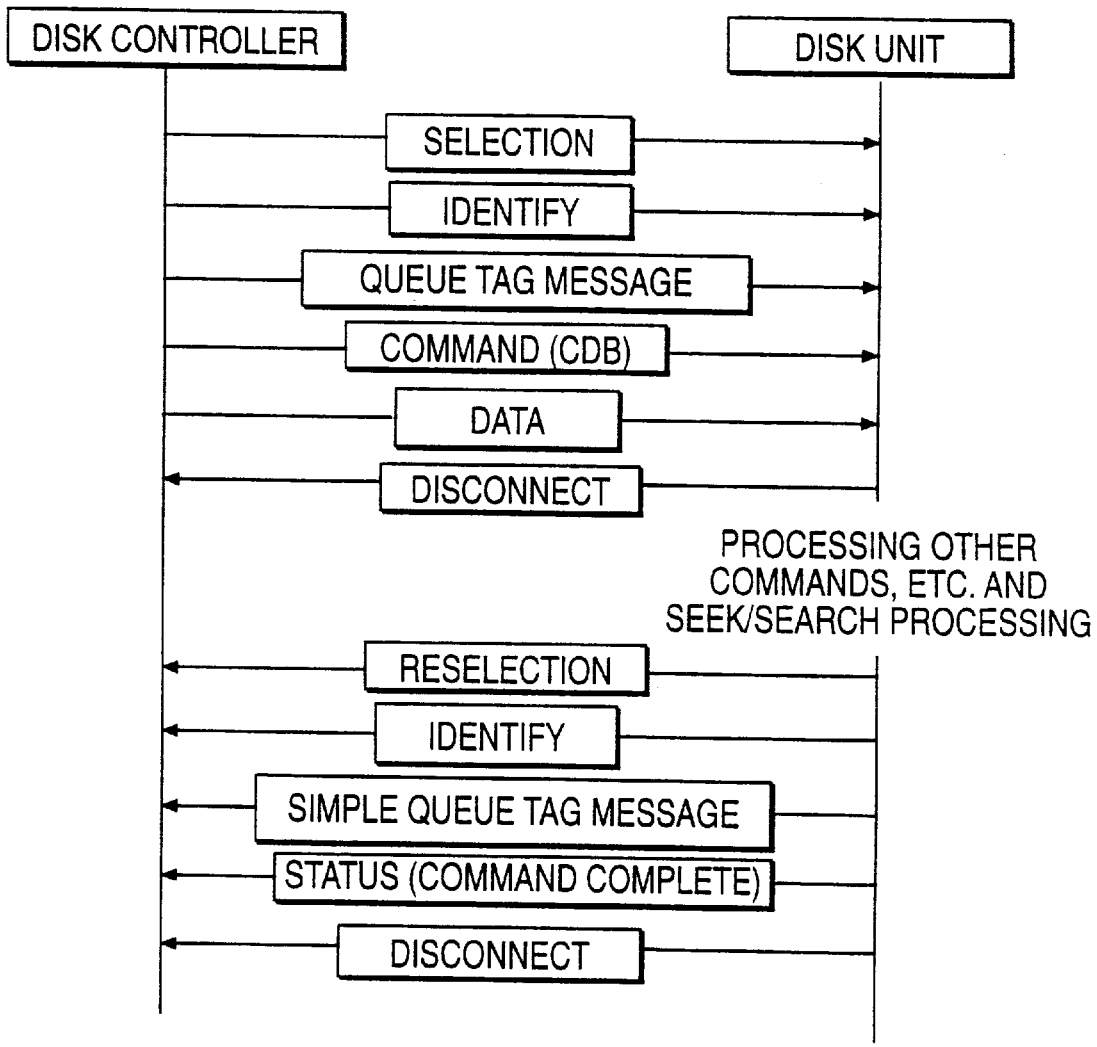
FIG. 6 is a message sequence of the present invention.

FIG. 6 shows a sequence of communication between the disk controller and the disk unit in the present invention. First the disk controller sends a mode sense command to the disk unit and receives a mode select parameter which the disk unit sends in response to the mode sense command (not shown in FIG. 3). After receiving a write request from the host computer (for example, a mainframe computer, server, etc.), the disk controller sets a logical connection (Selection) between the disk controller and the disk unit. Next the disk controller sends an Identify, a Queue Tag Message, a Command (CDB) and the Data to the disk unit. The disk unit disconnects the logical connection after receiving the data. After that, when the disk unit writes out data on the cache 209 to the disk 216, the disk unit sets a connection (Reselection) between the disk unit and the disk controller, to inform a status to the disk controller. After reselection the disk unit sends an identify, a Simple Queue Tag message and a Status "command complete", and the disk unit disconnects the connection.

Figure 7:
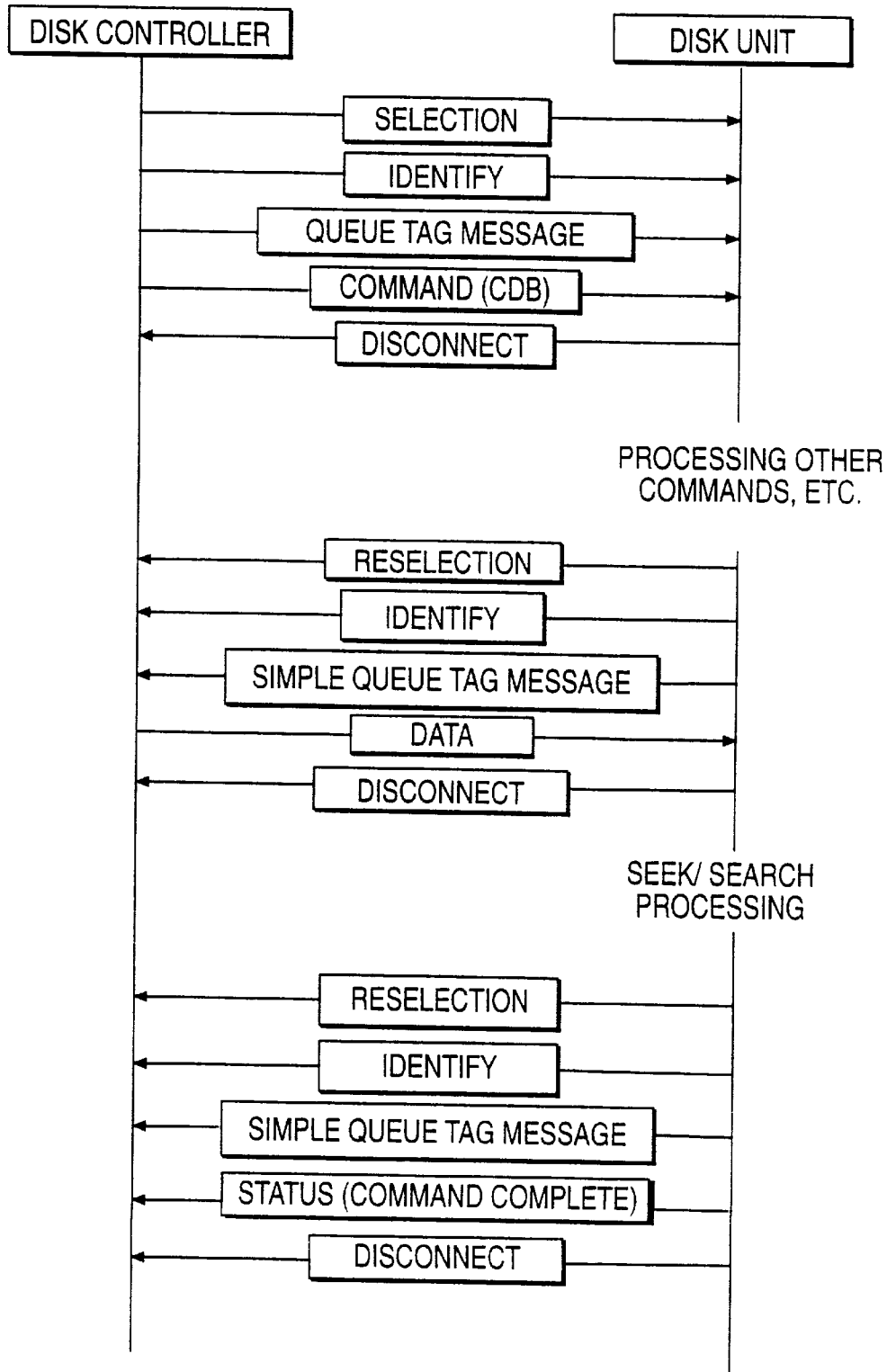
FIG. 7 is a message sequence of the prior art.

FIG. 7 shows a sequence of communication between the disk controller and the disk unit in the prior art. First the disk controller sets a connection between the disk controller and the disk unit. Then the disk controller sends the command. After that, a connection between the disk unit and disk controller is disconnected by the disk unit. Next, when the disk unit needs data for handling the command, the disk unit sets a connection (Reselection) between the disk unit and disk controller. After reselection, the disk controller sends the data to the disk unit in response to an Identify and a Simple Queue Tag message send from the disk unit. The disk unit disconnects the connection after receiving the data.

After that, when the disk unit writes out data on the cache corresponding to 209 into the disk corresponding to 216, the disk unit sets a connection (Reselection) between the disk unit and the disk controller, to inform the status to the disk controller. After reselection the disk unit sends an identify, a Simple Queue Tag message and a Status "command complete", and the disk unit disconnects the connection.

Compared with the prior art, in writing data into the disk unit, the number of connections according to the present invention is fewer than that of the prior art and the number of messages sent between the disk controller and the disk unit in the present invention is fewer than that of the prior art. Therefore the overhead and operation time in the disk controller, the disk unit and a network between the disk controller and the disk unit in the present invention is lesser than that of the prior art.

Queuing the commands as described above makes it possible to prevent an increase in the overhead of the SCSI buses in the write processing and of the disk controller.

According to the present invention, the data can be queued together with the commands at the time of queuing the commands provided the data to be written is small in amount. Besides, no data on the SCSI buses needs be transferred, and the SCSI buses and the disk controller need be kept waiting less frequently when the availability of the SCSI buses and the disk controller decrease or when the load of the SCSI buses and the disk controller decrease increases.

What is claimed is:

1. A storage system, comprising:

a disk unit having a disk for storing data;

a disk controller for sending commands and data to said disk unit;

said disk controller having a first circuit for sending said commands and said data to said disk unit; and a second circuit for deciding whether or not to send first data corresponding to a first command after sending said first command, based on a size of said first data and a storage capacity information received from said disk unit; and said disk unit having a queue for storing a plurality of commands received from said disk controller; and a buffer for storing a plurality of data received from said disk controller, each of said data corresponding to one of said commands.

2. A storage system, comprising:

a disk unit having a disk for storing data;

a disk controller for sending commands and data to said disk unit;

said disk controller having a first circuit for sending said commands and said data to said disk unit; and a second circuit for deciding whether or not to send first data corresponding to a first command after sending said first command, based on a size of said first data and a storage capacity information received from said disk unit; and said disk unit having a queue for storing a plurality of commands received from said disk controller; a buffer for storing a plurality of data received from said disk controller, each of said data corresponding to one of said commands; and a circuit for deciding whether or not to receive said first data after receiving to said first command, based on free capacity of said buffer and said size.

3. A disk controller which is to be connected to a host computer and a disk unit via a network, said disk controller comprising:

a host interface circuit for receiving a write request from said host computer;

a memory for storing data of said write request;

a network interface circuit for sending a write command corresponding to said write request and said data corresponding to said write request to said disk unit via said network, and for receiving information from said disk unit via said network; and a circuit for deciding whether or not to send said data to said disk unit after sending said write command, based on a size of said data and said information.

4. A disk controller according to claim 3, wherein said information is storage capacity information in said disk unit.

5. A disk controller according to claim 3, wherein said disk controller sends said data to said disk unit before said disk unit executes said write command.

6. A disk controller according to claim 3, wherein said write command includes parameter indicating whether or not to send said data after sending said write command.

7. A disk unit which is to be connected to a disk controller via a network, said disk unit comprising:

a network interface circuit for receiving commands and data via said network;

a queue for storing a plurality of commands received from said disk controller;

a buffer for storing a plurality of data received from said disk controller, each of said data corresponding to one of said commands;

a disk for storing data; and a circuit for deciding whether or not to receive first data corresponding to a first command after receiving said first command, based on free capacity of said buffer and information included in said first command.

8. A disk unit according to claim 11, wherein said information is a size of said first data.

9. A queuing system, comprising:

a target;

an initiator for sending commands and data to said target;

said initiator having a first circuit for deciding whether or not to send first data corresponding to a first command after sending said first command, based on a size of said first data and information received from said target; and said target having a queue for storing a plurality of commands received from said initiator; a buffer for storing a plurality of data received from said initiator, each of said data in said buffer corresponding to one of said commands in said queue; and a second circuit for deciding whether or not to receive said first data after receiving said first command, based on free capacity information of said buffer and information of said first command.

10. A queuing system according to claim 9, wherein said initiator sends said first data to said target using a same logical connection that is used for said first command.

11. A method of transferring a command and data from a disk controller to a disk unit, comprising:

a first step for deciding whether or not to send data corresponding to a command from said disk controller to said disk unit after sending said command from said disk controller to said disk unit, based on a size of said data and storage capacity information received from said disk unit;

a second step for sending said command having said size and first information indicating whether or not to send said data after sending said command, from the disk controller to said disk unit;

a third step for deciding whether or not to receive said data from said disk controller after receiving said command, based on said size and free capacity storage information of said disk unit, by the disk unit, when said first information indicates that said disk controller sends said data after sending said command; and a fourth step for sending said data from said disk controller to said disk unit when a decision of said third step is that said disk unit receives said data after receiving said command.

12. A method according to claim 11, further comprising:

a step for establishing a logical connection between said disk controller and said disk unit before sending said command from said disk controller to said disk unit; and a step for disconnecting said logical connection after sending said data from said disk controller to said disk unit.

* * * * *